INVENTORS
HENRY P. HUTCHINSON
AND PAUL R. ARENDT
BY
Moore, Hall & Pollock
THEIR ATTORNEY

SATELLITE AND SPACE COMMUNICATIONS SYSTEMS

Filed Jan. 16, 1964

7 Sheets-Sheet 2

INVENTORS
HENRY P. HUTCHINSON
AND PAUL R. ARENDT
BY
Moore, Hall & Pollock
THEIR ATTORNEY

SATELLITE AND SPACE COMMUNICATIONS SYSTEMS

Filed Jan. 16, 1964 7 Sheets-Sheet 3

INVENTORS
HENRY P. HUTCHINSON
AND PAUL R. ARENDT
BY Moore, Hall & Pollock
THEIR ATTORNEY INVENTORS
HENRY P. HUTCHINSON
BY AND PAUL R. ARENDT
Moore, Hall & Pollock
THEIR ATTORNEY

SATELLITE AND SPACE COMMUNICATIONS SYSTEMS

Filed Jan. 16, 1964 7 Sheets-Sheet 5

INVENTORS
HENRY P. HUTCHINSON
AND PAUL R. ARENDT
BY Moore, Hall + Pollock
THEIR ATTORNEY July 19, 1966 H. P. HUTCHINSON ET AL 3,262,116

SATELLITE AND SPACE COMMUNICATIONS SYSTEMS

Filed Jan. 16, 1964 7 Sheets-Sheet 6

INVENTORS
HENRY P. HUTCHINSON
BY AND PAUL R. ARENDT
Moore, Hall & Pollock
THEIR ATTORNEY

SATELLITE AND SPACE COMMUNICATIONS SYSTEMS

Filed Jan. 16, 1964 7 Sheets-Sheet 7

INVENTORS
HENRY P. HUTCHINSON
AND PAUL R. ARENDT
BY *Moore, Hall & Pollock*
THEIR ATTORNEY United States Patent Office 3,262,116 Patented July 19, 1966

3,262,116

SATELLITE AND SPACE COMMUNICATIONS SYSTEMS

Henry P. Hutchinson, Ridgewood, and Paul R. Arendt, Eatontown, N.J., assignors to Satellite and Space Communications Systems, Inc.

Filed Jan. 16, 1964, Ser. No. 338,179
30 Claims. (Cl. 343—100)

This application comprises a continuation-in-part of my prior copending application Serial No. 29,111 filed May 13, 1960, for "Satellite and Space Communications Systems," now abandoned.

This invention relates to methods and means for providing optimum radio communications, or electromagnetic signalling, or transmission and reception of data or other information or intelligence between a ground station on or near the earth's surface, and a space station travelling in accordance with Newton's laws of motion in the first approximation, between space stations, and among the various types of earth and space stations.

This invention comprises a major means for improvement of moon-relay or other radio communication systems using reflections of beamed signals from a planet or other astronomical body. An additional purpose of this invention is to provide sufficient means for tracking satellites so that the beams of radio energy emitted from the earth station will continually illuminate the space station in spite of the phenomena of refraction, bending, scattering, and scintillation of the beamed energy, all of which phenomena are due to nature processes more fully reviewed below.

Furthermore, in addition to these natural processes, it is known to us by careful study of radio signals received from many United States and Russian satellites, that there occur serious deficiencies in the reception and transmission of electromagnetic energy between earth and space stations because of the spinning and tumbling of such satellites and because of the non-isotropic nature of antenna patterns, including both the simple dipole and more complex structures. As a result of this spinning and tumbling, large unwanted variations occur in the signal received at the space station from a beam of uniform energy radiated by a ground station and similarly, large unwanted variations occur in the reception by a ground station of constant-amplitude signals radiated by space stations. Thus, under normal conditions where space stations are spinning or tumbling with respect to the direction of the energy-transmission path to either an earth station or to another space station, it has not been possible with previously known techniques to maintain continuous signalling or transmission of electromagnetic energy between such stations; it has only been possible to have a series of discontinuous transmissions depending upon the relative spinning or tumbling motions cited above.

An object of this invention is to provide continuous real-time radio communications (including either transmission or reception of data or other signals) between earth and space stations and between two or more space stations.

Another important feature of this invention is to provide a preferred means for maintaining such continuous real-time communications in spite of various adverse natural or man-made environmental phenomena by using a particular frequency band of electromagnetic radiation. We have found that the use of other higher or lower frequency bands causes sufficient bending, absorption, scattering, or other distortions and degradation of the signals to require at best an excessive amount of electrical power for transmission and, at worst, result in an inability to maintain communications.

Still another feature of this invention relates to the use of several pluralities of geographically widely-separated stations, the separation of the stations in each plurality being measured in terms of hundreds or thousands of miles and which are linked by the communications system of our invention. For the purpose of describing this invention a plurality of ground stations situated on the earth's surface will be used, but it is nevertheless a part of our invention that one or more of the geographically widely-separated stations used in this system will be established on the moon or other planets, planetoids, or satellites, and therefore, in the context of this invention, the expression "geographically widely-separated" is to be taken as not limited to points on the earth's surface, but in fact is intended to include specifically any combination of locations on the earth's surface, natural planets or planetoids, and man-made space stations.

This feature of the invention overcomes the large-amplitude variations caused by the spinning and tumbling of a space station with respect to the ray path to any other station. Furthermore, it ensures that upon the transmission of a signal from one of these stations it will be received at any other station after a lapse of time sufficient only for the electromagnetic energy to travel from one station to the other. Thus, if a plurality of signals is radiated, each signal comprising the same intelligence and each transmitted from a different one of the widely-separated stations, the reception of these signals will commence as soon as the radiated energy has reached the intended receiving station and the reception of the intelligence will go on continuously as long as the receiving station is illuminated by at least one of the plurality of transmitting stations. Conversely, if the reception of an intelligence signal by the plurality of stations is desired, this reception will commence as soon as the energy reaches one station having its antenna oriented to intercept sufficient energy from the passing electromagnetic wave and will continue as long as at least one of the plurality of receiving stations is receiving the radiated signal. In the case of ground stations on the earth's surface and space stations, which are earth satellites, the period of continuous reception from any one station might vary from a few minutes for an earth satellite in a polar orbit to continuous operation for an earth satellite in the approximately 22,000 mile stationary equatorial orbit.

These and other objects and features of this invention will be more readily understood from the following detailed description of a preferred embodiment, which is shown in the accompanying illustration and drawings. However, before proceeding to this detailed description, the general organization of this invention, as described above, will be more fully indicated in drawings and by further description.

In the drawings:

FIGURE 1A diagrammatically illustrates one arrangement for providing communications between earth and space stations;

Figure 8:
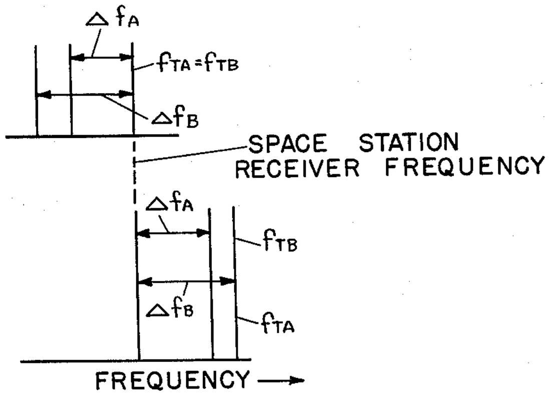
Figure 9:
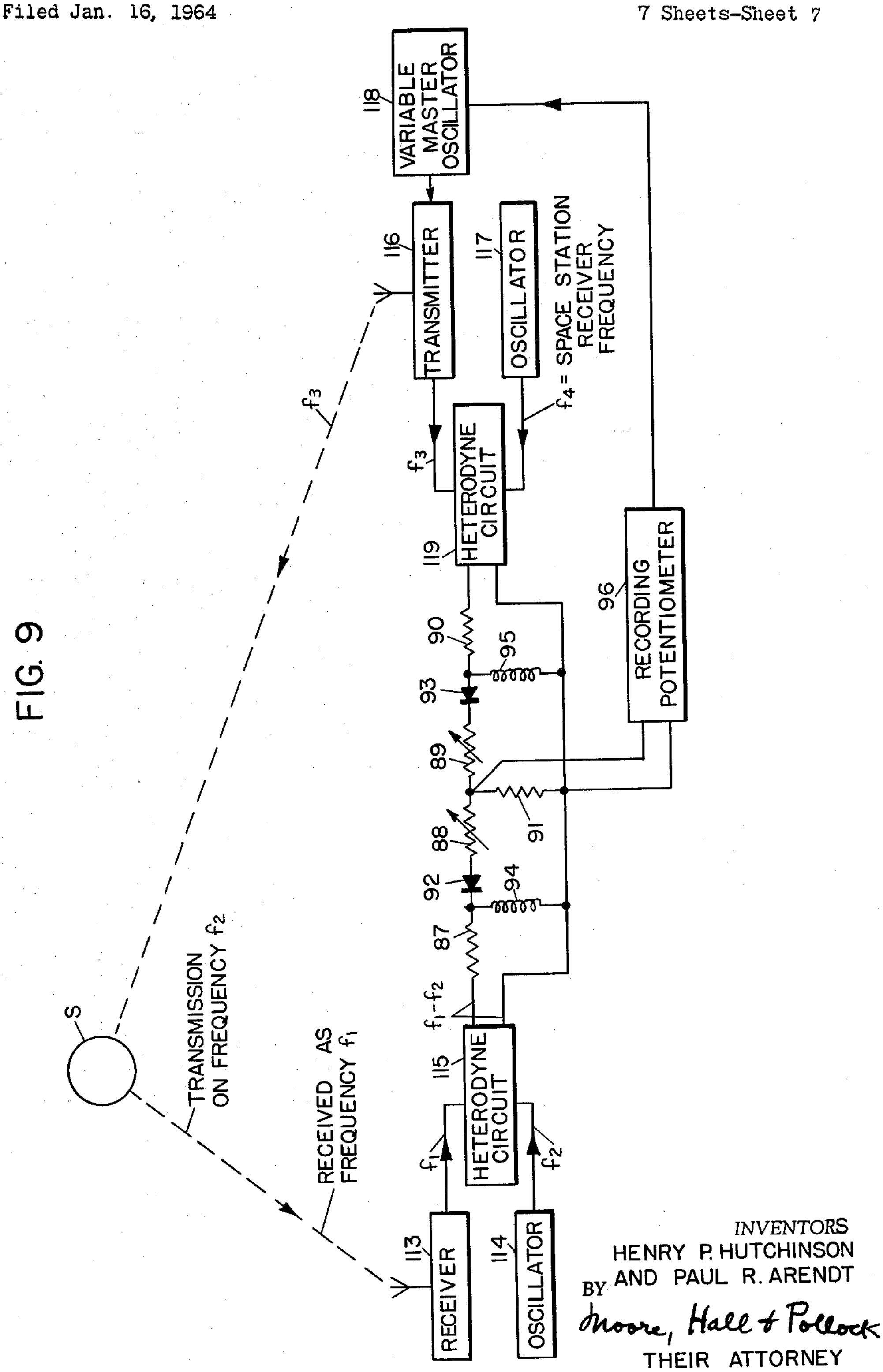

FIGURE 8 graphically illustrates some of the factors involved in correcting for Doppler frequency shifts; and FIGURE 9 illustrates apparatus providing for the automatic control of frequency to compensate for Doppler shift.

FUNCTION OF SYSTEM COMPONENTS

Figure 1A:
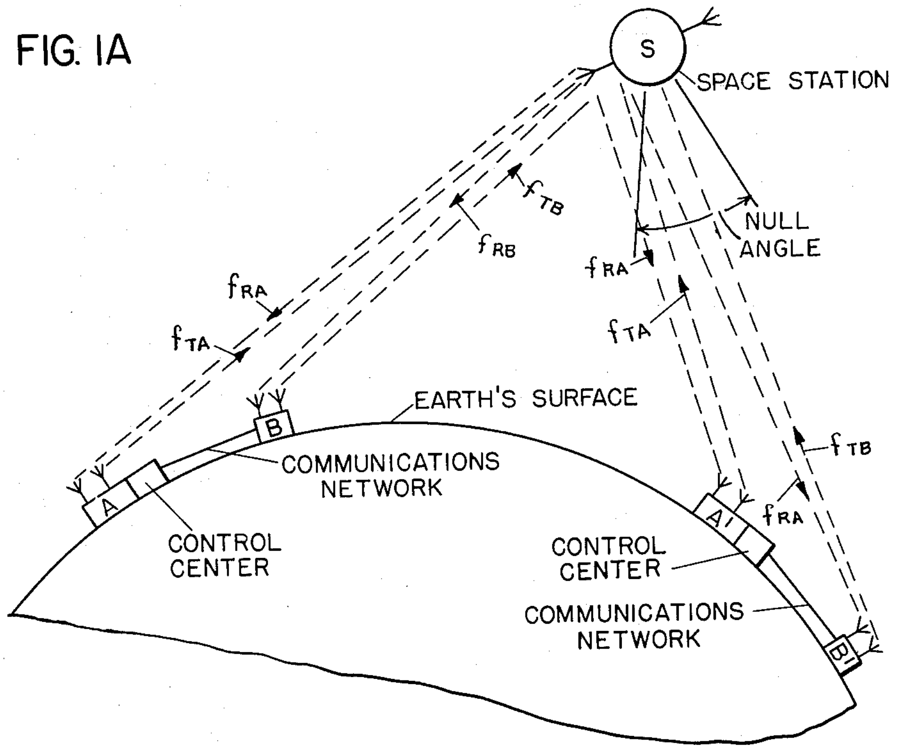
FIGURE 1B is a block diagram showing in greater detail the components of the system of FIGURE 1A.

FIGURE 1A illustrates diagrammatically one aspect of our invention. The system illustrated provides for real time communications from one location to another on the earth surface via a space station S. It is assumed that the two earth locations are so widely separated that direct communications between them are not practicable but that the two locations are not so widely spaced as to make it impossible for each of them to communicate with space station S. It should be understood that, although the two locations, i.e., the one including stations A and B and the other including stations A′ and B′, are both shown as being located on the earth's surface, this is by no means necessary for the practice of our invention which also comprehends, as previously stated, communications between space stations, from the earth to a space station and then to a second space station, and all other such configurations.

In FIGURE 1A, it is shown that the stations A and B (or A′ and B′) at each communications location are connected by a communications network, the primary purpose of which is to permit transmission or reception of the same intelligence signal by either of the two stations. Thus, we contemplate that an intelligence signal to be transmitted from one earth location to the other may be transmitted simultaneously from both stations A and B on respective frequencies $f_{ta}$ and $f_{tb}$, and, furthermore, that both these stations A and B may, at times, simultaneously receive signals from the space station on respective frequencies $f_{ra}$ and $f_{rb}$.

Figure 1B:
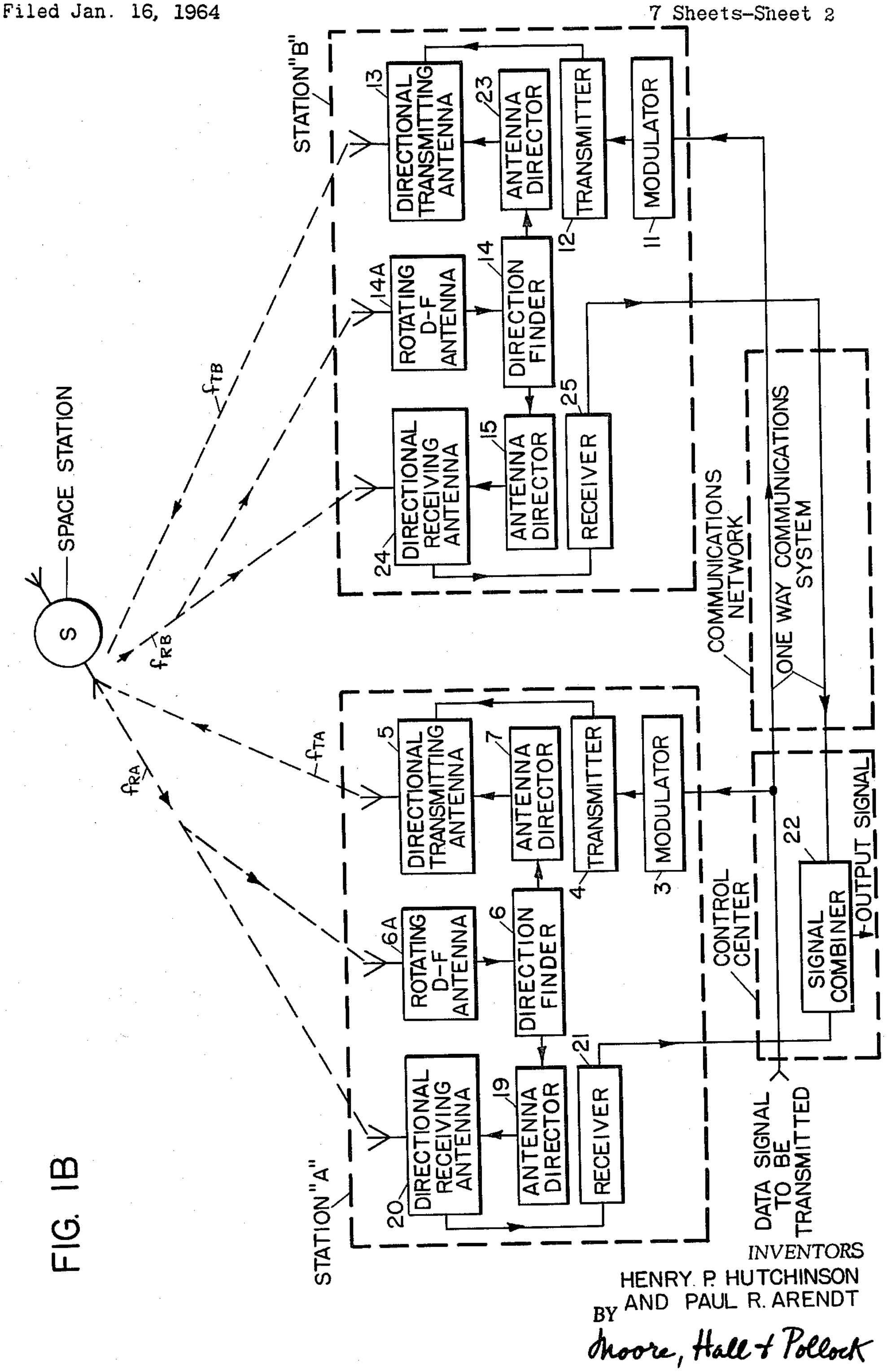

In FIGURE 1B we have shown in greater detail the system organization of the appratus for stations A and B at one of these locations.

The two ground stations A and B may be separated from each other by a distance of several hundred miles along the earth's surface. Space station S both receives from and transmits to stations A and B in real time, as shown below. In FIG. 1B, the input signal which is to be transmitted from the earth to space station S is applied to modulator 3 which modulates transmitter 4 and delivers the radio-frequency output of the transmitter 4 to a controllable directional antenna 5 located at station A. This antenna 5 is controlled by a three-dimensional radio-direction-finder 6, which is located at or sufficiently close to station A so that the direction from antenna 6A for direction finder 6 to the space station S is within the limits of the beam widths of both the transmitting antenna 5 and receiving antenna 20. Thus, to a first approximation, the same azimuth and elevation bearings from station A to space station S apply for the radio-direction-finder antenna 6A, the transmitting antenna 5 and the receiving antenna 20.

The direction finder 6 detects the radio transmissions emitted from space station S on a radio frequency $f_{ra}$ and continuously determines the angular directions of azimuth and elevation bearings used to control both the transmitting antenna 5 and the receiving antenna 20. Thus, the output signals of the direction finder 6, which contain the angular information required for positioning antennas 5 and 20 are applied to the respective antenna directors 7 and 19. Antenna director 7 positions antenna 5 in the direction required to illuminate the satellite S with the radio-wave energy carrying the signals or modulation connected to modulator 3. Antenna director 19 similarly positions the receiving antenna 20 in the direction required to receive maximum output from radio emissions from the space station S.

The input signals connected to modulator 3 are also transmitted over a ground-to-ground communications system to modulator 11 at station B. In the same manner as previously described for station A, this signal modulates a transmitter 12, and the radio-wave output energy from the transmitter is connected to a controllable directional antenna 13. This controllable directional antenna 13 and a directional receiving antenna 24 are, in a similar manner to that described for station A, controlled by antenna directors 23 and 15 respectively, both of which are operable from output signals from direction finder 14 connected to direction-finder antenna 14A. Directional bearings from station B to space station S are determined by radio-direction-finder 14, which through the antenna directors 15 and 23 illuminates the space station S with radio-wave output energy from transmitter 12 and positions the receiving antenna 24 to receive maximum output from radio emissions from station S.

In this manner, each of the ground stations used in this embodiment of our invention continuously illuminates the space station S with its radio beam for the period of time that the space station S is within view of stations A and B. Now let $f_{ta}$ designate the frequency of signals in the transmitted radio beam from station A and $f_{tb}$ the frequency of the signals in the radio beam from station B. As previously indicated, the distance between stations A and B measured along the earth's surface is measured in hundreds or even thousands of miles. Thus, at any instant, the points comprising stations A, B, and S constitute a triangle of which one angle is ASB, designated as $\alpha_{AB}$. This angle $\alpha_{AB}$ measures the difference in direction between the radio beams arriving at space station S from ground stations A and B. Similarly, if additional system stations were established at additional geographical locations either on the earth, or moon, or other planet or planetoid, or space station, it is clear that the beam from each of these additional stations would illuminate the space station S from a different direction, as seen from the space station, thus generating additional angles $\alpha_{BC}$, $\alpha_{AC}$, et cetera, depending upon the plurality of stations used. Now let us consider reception of these multiple beams at space station S.

Figure 2:
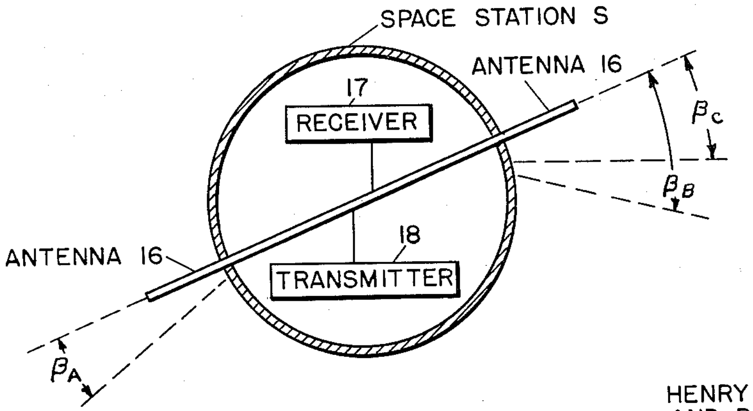
FIGURE 2 illustrates certain characteristics of the directional antenna employed by a space station.

In FIGURE 2 there is shown a dipole antenna 16 at space station S. This antenna is aligned so that the angle $\beta_A$ exists between the axis of the dipole and the beam $f_{ta}$ of radio-wave energy received from ground station A. Similarly, angles $\beta_B$, $\beta_C$, et cetera, exist between the axis of the dipole and the other beams $f_{tb}$, $f_{tc}$, et cetera, illuminating the space station S. Now it is well known that a dipole has induced in it a maximum radio frequency voltage when the direction of the electric field of the incident electromagnetic wave is parallel to the length of the dipole. Furthermore, as the direction between the incident electric field of a wave passing the space station S changes from one in which the space station dipole is parallel to the field and becomes one in which the space station dipole 16 becomes perpendicular to the electric field of the passing wave, the induced signal in the dipole will drop to zero. Therefore, as space station S spins or tumbles in its orbit, these changes in its attitude with respect to the oncoming beam from any single station, such as station A, will cause large changes in the signal induced in the dipole and thus in the space station received signal.

A space station antenna 16 has a null direction, that is one in which minimum signals are received, and at times the null of the space station antenna 16 will be coincident with the direction of one of the beams illuminating the space station and, therefore, a minimum or no signal will be received from that station. However, since our invention insures that signals bearing the same modulation will be arriving at the satellite or space station S substantially simultaneously from substantially different directions, which difference in directions exceeds the null width of the space station antenna, there will always be energy available from at least one of the beams illuminating the space station S when it happens that the null direction of the space station dipole (or other antenna) coincides with the direction of a particular one of the illuminating beams. Therefore, as this invention shows, the use of two or more beams arriving simultaneously from different directions overcomes the lack of an isotropic radiator or equal-amplitude antenna pattern extending over the $4\pi$ sperical radians denoting all directions extending outward from space station S.

Continuing with the system description, the frequencies $f_{ta}$ and $f_{tb}$ bearing the same modulations induce voltages in dipole 16 at the space station S. Since, at any instant of time, only one of the illuminating frequencies $f_{ta}$, $f_{tb}$, et cetera, can be in the null of the receiving antenna pattern, signals are continuously induced in the receiving antenna and fed from the receiving antenna 16 to a receiver 17 which provided the real-time reception of signals continuously at the space station S as long as signals are being sent by the ground stations A, B, et cetera.

Transmission from space station S to the earth is by a transmitter 18 at the space station, which radiates energy simultaneously towards a plurality of earth stations; namely stations A, B, et cetera. Since, as explained above and shown in FIGURE 2, stations A, B, C, et cetera lie in different directions from space station S, then at such times as the null pattern of the antenna at space station S lies in the direction of a particular one of the plurality of ground stations, thus affording that particular station a minimum or even unusable signal, the other ground stations do not lie in the null of the space station antenna pattern and will receive stronger and usable signals. Thus, it is seen that no matter when radio emissions are radiated from the space station S, there will at most be only one ground station which lies in the null of the space station antenna and, therefore, the ground part of this system will receive and transmit to the ground control point signals or other intelligence, as previously defined above, from space station S. These signals will, of course, be received by the remainder of the plurality of ground stations whose locations are such that, at any instant, they do not lie in the null of the space station antenna.

Now referring to FIGURE 1B, the radio-direction-finder 6, whose antenna 6A has detected the signals from space station transmitter 18 and determined the direction of the space station S with reference to earth station A, controls antenna director 19 to orient receiving antenna 20 so as to align the receiving antenna beam along the ray path at station A of the received radio wave $f_{ra}$ from space station S. The received energy is connected to receiver 21 which receives and demodulates the incoming signal and delivers the demodulated output to a signal combiner 22. In a similar fashion, the radio-directional-finder at station B is connected to control antenna direction 23 to align the beam of receiving antenna 24 in the direction of the received energy $f_{rb}$. This received energy is connected to receiver 25 and demodulated. The resulting signal is applied over a communications channel from station B to station A. The output of this channel is then connected to signal combiner 22, and the combined output (that from receiver 21 at station A and that from receiver 25 at station B) is made available as a system output.

The earth system input signal terminal and output signal terminal, therefore, comprise the system ground terminals of this real-time satellite and space communications system. To these terminals may be connected a telephone, teletypewriter, computer, or other device or combinations of such devices depending upon the intelligence which it is desired to transmit to and receive from space station S. Furthermore, since this system may have separate input and output terminations at both the earth control station and at space station S (as shown, more partciularly, in FIG. 4), it is possible, but not necessary, to transmit one type of intelligence from the ground to the space station and another type of intelligence simultaneously from the space station to the ground. Therefore, in addition to having described a system for continuous real-time communication between the earth and space stations, and between earth stations via a space station, we have described a system which transmits on a continuous basis, different kinds of intelligence for each direction of transmission. In particular, with an unmanned space station, it would be expected that telegraph, teletype, computer signal, or other coded commands would be transmitted to the space station in order to affect or control its position in space, its attitude, or to start, stop, or control various functions of the apparatus carried in the space station, including the function of control of ejection of material from the space station; whereas transmissions from such an unmanned space station would give indication of receipt and execution of such control functions and would telemeter data observed at the space station on either its own functions or on its environment or in connection with other experiments.

The next functional aspect of this invention describes a method and means for obtaining an improvement of transmission of signals to the moon or other planet. It is clear that as the distance of the space station S increases from the earth, a point will be reached at which it will be necessary to use an earth-moon communications system at the internal communication systems of our invention. That is, Station A will be on the earth and the other stations B, C, et cetera, will be on the moon and other planets. Furthermore, such an improvement may be used in moon-relay systems for providing more effective transmission of signals from earth to earth stations via moon relay.

Figure 3:
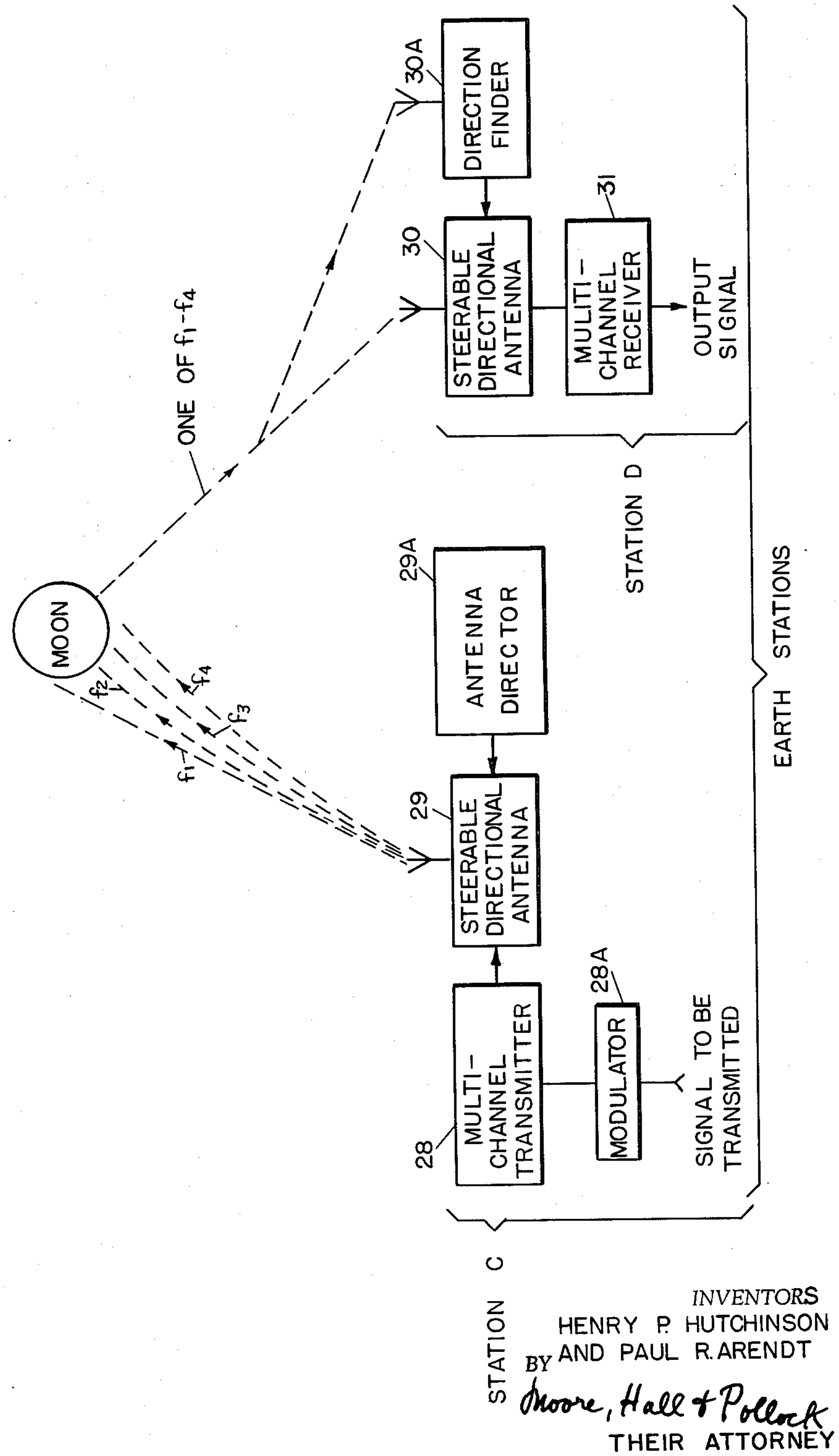
FIGURE 3 illustrates a system of communications between two earth stations via a passive space station reflector such as the moon.

In FIGURE 3 is shown a system for communicating between widely spaced earth stations via reflections from a moon or other passive reflection. It should be noted, however, that this system is not to be considered as limited to one in which the stations are necessarily on the earth, since one or more of the stations may be on a space station at a great distance from the earth. In the system of FIGURE 3, transmission of signals takes place from a multi-channel transmitter 28 and steerable directional antenna 29 aimed at the earth's moon M. In this system the transmitter 28 generates and the antenna 29 radiates a plurality of radio frequencies, for example, $f_1$, $f_2$, $f_3$, $f_4$, each of which by virtue of their frequency separation, is bent to a different degree in passing from the earth's surface through the atmosphere and ionosphere which surrounds the earth. Each frequency $f_1$–$f_4$ is modulated by modulator 28A in accordance with the signal to be transmitted. By using this multi-frequency type of radiation, a spreading can be obtained in the effective beam width so that it can be made several times greater than that necessary to cover either the whole of the moon's surface or a specific part thereof (for example, the first Fresnel zone).

It is known to us that signals received from space stations appear to come at varying times from positions ahead of, behind, or to one side of the true bearings at that instant from the earth's position. This is due to both systematic deviations caused by refractive effects, and random variations caused by natural changes in the electron density of the ionosphere. These natural changes are due to solar radiation, ion recombination, ionization, ionospheric winds, and other natural phenomena. The total effect of all these conditions causes the received beam to vary continuously to a greater or lesser extent from the true bearing from earth to the space station. In a similar fashion, these and other natural phenomena (tropospheric effects) will affect any radio wave aimed from the earth in the direction of the earth's moon or other planet. Now as the radiated energy in frequencies $f_1$, $f_2$, $f_3$, and $f_4$ is kept aimed in the direction of the moon (using, if necessary, an ephemeris of the moon to obtain the direction of the moon from station C and control antenna director 29A) the beamed energy will illuminate the moon, or the specific portion thereof desired, by these transmitted frequencies. Because of the ray bending and scintillation effects mentioned above, at different instants of time, one of the above radio frequencies will provide both optimum illumination of the moon and maximum reflected signal from the moon M to earth station D. Thus the strength of the received signal at station D depends largely at any instant of time upon the following:

(a) that frequency which most effectively illuminates the moon, or the desired portion thereof;
(b) that frequency most effectively reflected by the moon;
(c) ionospheric and tropospheric effects in the regions between the moon M and stations C and D respectively.

From the above, it is clear that a directional antenna 30 located at station D and pointed in the direction of the moon M by direction finder 30A which is responsive to the moon-reflected energy will receive fluctuating energy from the various frequencies $f_1$, $f_2$, $f_3$, and $f_4$ as a function of time. The antenna delivers the collected energy to a multi-channel receiver 31 which responds to the strongest carrier present, demodulates this signal and delivers this signal to station D, thus accomplishing transmission of information or signal from station C to station D. Since the same modulation is used simultaneously on all the carrier frequencies $f_1$, $f_2$, $f_3$, and $f_4$, it is unimportant which of these frequencies carries the information at any instant and continuous communications are thereby maintained. It is clear, however, that for frequencies sufficiently low to be affected by the ionosphere, the use of a single frequency is insufficient to maintain continuous communications and that an optimum system requires a multiplicity of frequencies. Transmission in the reverse direction from station to station C is carried out in a similar fashion.

By substituting a space station S for the moon M in the multi-frequency communications system just discussed, it is possible to obtain a variation of the above system for space station use. Under certain circumstances, such as the availability of a space station, with controllable antennas, whose nulls will always be directed away from the earth, this variation may be used as a single earth station to satellite or space station system; whereas if the above does not apply, the variation may be used in combination with our multi-station earth to space station communications system described above.

Figure 4:
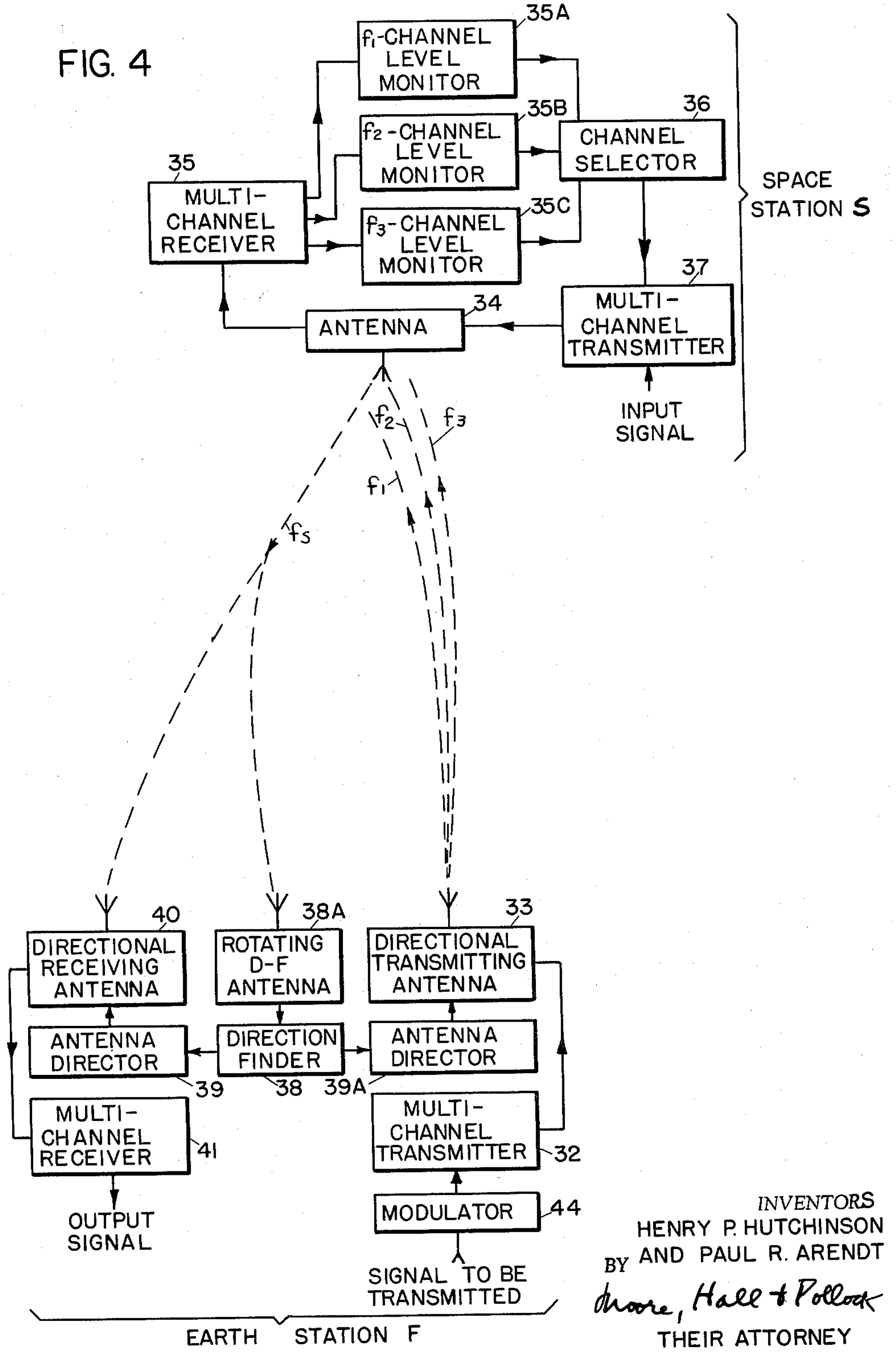
FIGURE 4 is a block diagram illustrating a multichannel communication system between two stations in space, one of which may be on the earth's surface.

Referring to FIGURE 4, radio frequency energy generated at a plurality of radio frequencies $f_1$, $f_2$ and $f_3$ by transmitter 32 is radiated by a beamed antenna 33 in the direction of the path of space station S. Each transmitted frequency is modulated by modulator 44 according to the signal to be transmitted. As indicated above, at some time when the space station comes into the beam of antenna 33, one of the frequencies $f_1$ through $f_3$ will be received with the greatest intensity by antenna 34 at the space station S. The received radio-frequency energy is connected to the receiver 35 which identifies which of the frequencies $f_1$ through $f_3$ is the strongest and causes the space station transmitter 37 to radiate a signal on a frequency which is sufficiently close to the frequency received from the earth so that the principle of reciprocity along the transmission path is maintained. Under this condition, the frequency $f_s$ emitted from the space station S will be received at the earth station F with sufficient intensity to provide a useable signal.

The multichannel receiver 35 produces a separate output signal for each of its several channels corresponding, respectively, to the frequencies $f_1$–$f_3$. The amplitude of the signal appearing on any one channel is dependent upon the amplitude of the corresponding signal and, conceivably, one or more channels may produce zero output if antenna 34 receives no signal on the corresponding frequency.

Each of the separate outputs of receiver 35 is applied to a level monitor which may, for example, be of the type shown in Patent 1,823,739, issued September 15, 1931. Such a level monitor comprises a plurality of amplitude responsive circuits which are selectively operated in accordance with the amplitude of input signal applied to the level monitor. Thus, the output of any one of these level monitors shown in FIGURE 4 may comprise a plurality of relays, each of which is operated from its normal condition only when the input signal applied to the level monitor exceeds a predetermined corresponding value. Thus, the conditions of these relays for any one level monitor indicate at each instant the level of the input signal applied thereto. It is well known in the art how the contacts of the various relays for each of the level monitors 35A–35C may be connected to comprise what is termed a channel selector 36 which, in effect, determines which of the several level monitors is receiving the highest amplitude of input signal, thereby effectively also determining which of the signals $f_1$–$f_3$ is then being most effectively received by antenna 34 and determining also which of the several possible output frequencies of transmitter 37 is closest to that of the strongest received frequency in order that reciprocity in return transmission to earth station S will be obtained.

This feature of our invention has to do with the selection from among a plurality of available radio frequencies that frequency for which at any instant of time the best propagation condition between earth and space stations occurs. The emitted signal on frequency $f_s$ from space station S is received at earth station F by a radio-direction-finder 38 whose rotating antenna 38A is responsive to the $f_s$ signal and which, through antenna directors 39 and 39A point the receiving antenna 40 and the transmitting antenna 33, respectively, in the direction of the energy received on frequency $f_s$.

Operation of the radio-direction-finder 38 completes a closed loop energy system consisting of the following:

(1) Transmission from station F on a multi-frequency basis;
(2) Reception of the optimum frequency at space station S;
(3) Transmission from space station S on a frequency $f_s$ sufficiently close to the received optimum frequency for reciprocity to hold;
(4) Reception of frequency $f_s$ of the direction-finder antenna 38A.

Operation of this closed loop system on continuous real-time basis is contingent upon the following:

(a) Either the space station or its antenna is stabilized in such a manner that the null of the space stations antenna never lies in the direction from the space station S to the ground station F.
(b) As propagation or other conditions change, the optimum frequency will vary among those selected and available for use at earth station F. Furthermore, from the plurality of frequencies available at the ground station F, there will be a similar number of frequencies $f_{s1}$, $f_{s2}$, et cetera, available at the space station.

When the above-mentioned closed loop energy system has been established and the earth station F receiving antenna 40 has been aligned to maximize collection of the incoming radio-frequency energy on frequency $f_s$, this energy is coupled from receiving antenna 40 to multi-channel receiver 41 which then provides an intelligence signal output. Signals which are to be transmitted from space station S to earth station F may be generated at the space station itself or may be received from another earth or space station for direct retransmission to station F. Alternatively, such signals may be stored at station S for later relay to station F when communications are established as evidenced by the presence of an output from space station receiver 35 in response to one or more of the frequencies $f_1$–$f_4$. Whatever the source of the signal, it is applied as a modulating input to transmitter 37 which then transmits on the selected one of the frequencies $f_1$–$f_4$. In this manner two-way communication is established and maintained on a continuous basis between earth station F and space station S. As mentioned above, it should be noted that this feature of our invention applies to the establishment of continuous two-way communications with space stations which have been stabilized in their attitude, or provided with other means for keeping their antenna or antennas so oriented that they can maintain a continuous radiation of energy in the direction of the path to the ground station on the earth's surface.

The final part of this description of system functions relates to our discovery of a method and means for obtaining optimum performance of the two following system functions, each of which is part of our invention.

(1) Communications;

(2) Tracking and position location.

Although each of these aspects is related to the frequency scintillations observed from both earth satellites and solar satellite transmissions, the optimum frequency bands for each function are not the same. In fact, our discovery leads us to the conclusions that the optimum band of frequencies for precision tracking and position location of earth satellite's and space stations from the surface of the earth is included within and is a relatively small part of that frequency band, which is optimum for communications between stations on the earth's surface, as described above, and earth satellite or space stations. Based upon recent experimental recordings of earth satellite and space probe signals, it now has become clear to us that the lowest radio frequency suitable for earth to earth satellite or earth to space station communications lies at a sufficiently high radio frequency so that frequency scintillations of the received signal are negligible. Because of effects of the ionosphere, these frequency scintillations do not become negligible until the transmitted frequency is greater than 500 mc./s. On the other hand, tropospheric inhomogeneities also create amplitude scintillations, which degrade the received signals at frequencies greater than 4,000 mc./s. From the above, it is clear that to obtain satisfactory and reliable communications between the earth and earth satellites and space stations, it is necessary, for optimum conditions, which include the avoidance of frequency scintillations caused by the ionosphere and amplitude scintillations caused by the troposphere, to use a particular band of radio frequencies. Our method consists of radiating signals for this purpose in the frequency band of 500 mc./s to 4,000 mc./s.

For tracking and position location purposes, and especially where precision tracking from the earth's surface is required, as it is in our real-time communications system, the transmission requirements are more severe than for signalling. For precision tracking, it is essential to operate in a frequency range where neither disturbances caused by turbulence of the transmission medium refractive effects, scatter and variations due to inhomogeneities, and the effects of frequency scintillations are sufficient to distort the received signals, or cause sufficient variations in delay of the received signal to the point where the tracking or location systems yields large errors or fails. This means that the refractive index of the media should, for the frequency chosen, be as close as possible to a value of unity (the free space value), and furthermore, this value should be most uniform along the entire ray path. According to our discoveries, based on frequency scintillation data, these features can be best approximated by radio transmissions in the frequency range of 650–1050 mc./s. Within this frequency range, centered about an optimum value in the neighborhood of 850 mc./s., the received signals and radio-wave emissions are least affected by the undesirable effects of both the ionosphere and the troposphere. Our method of minimizing tracking and position-location errors, therefore, consists of using emitted and received radio waves for such purposes in the frequency band of 650–1050 mc./s. These uses include both the position location of earth satellites and other space stations as well as the tracking of such objects. Furthermore, it is a feature of our discovery and invention of this method that in position tracking and position location systems in which there is much difficulty caused by radiowave propagation phenomena, we use an optimum value of approximately 850 mc./s.

A further feature of our invention is the provision of means within the system for equalizing the time of transmission of the modulations from the various stations A, B, et cetera, so that these modulations or modulated signals will arrive simultaneously, within acceptable time limitations, at the satellite or space station. Since the modulated signal or radio wave from each of the stations A, B, et cetera must in general travel a different distance from the radio transmitter for that station, to the space station or satellite, it is then, under some circumstances, necessary to provide suitable time delays in the transmission system for each of the transmitting stations and adjust these time delays so that the modulated signals arrive simultaneously at the space station. Means for providing the necessary time delays will be included in the detailed description.

Another feature of our invention is the provision within the system for varying the radio frequencies transmitted from each of the stations A, B, et cetera, to the satellite or space station from the nominal value of assigned radio frequency. This means of variation is necessary to assure that the earth satellite or space station receiver will simultaneously receive radio emissions from each of stations A, B, et cetera, within its pass band of radio frequencies. It is easily seen that at times the satellite will be approaching station A while receding from station B and under these circumstances the transmissions from station A must be reduced in frequency by an amount approximately equal to the Doppler shift from station A and the transmissions from station B must be increased by an amount approximately equal to the Doppler shift B. The result of controlling these transmissions in this manner will be to maintain transmissions to the earth satellite or space station within a narrower tolerance of pass band and thus provide the possibility of enhanced receiver sensitivity and reduced interference. For the return signal, since the satellite or space station is operating one transmitter, it is necessary that each of the receiving stations adjust its frequency of reception so as to maintain optimum reception of the incoming signal.

While for earth satellite communications, these Doppler effects are not particularly large, nevertheless, they are important. Also, in the case of space stations, which will operate at increasingly higher speeds, it is necessary to take care of the relativistic effects on the Doppler shift. That these shifts in radio frequency can become appreciable compared to our present ideas and considerations bearing on the use of radio frequencies is seen from the fact that the factor involved is the following:

$$\frac{\Delta f}{f}=\frac{v}{c}\left(1+\frac{c}{2c}\right)$$

where $v$ is the velocity of the vehicle, $c$ is the velocity of propagation, and the term $$\frac{v}{2c}$$

is the relativistic effect. For an operating frequency of 1,000 mc./s., a vehicle travelling at 5 miles/sec. has a maximum Doppler shift of about 25 kc./s. If the vehicle's speed increases to 20,000 miles/sec., then the maximum Doppler shift due to its motion will be about 100 mc./s., and the increase in this shift due to the relativistic effect is another 5.0 mc./s. Where the ground controlled system is required to communicate with more than one earth satellite or space station, the same considerations above apply, and it is necessary to so operate the system that each of the earth satellite or space stations receives signals of such frequencies that they will appear within the pass band of the satellite or space station receiver.

*Detailed description of special features*

As shown in FIGURE 1B, direction finders 6, 14 are used to control both the azimuth and elevation of transmitting antennas 5, 13 and receiving antennas 20, 24 respectively. One means by which one of these angles, i.e., azimuth or elevation, can be determined, will now be described.

Obviously, similar apparatus may be employed to determine elevation.

Figure 5:
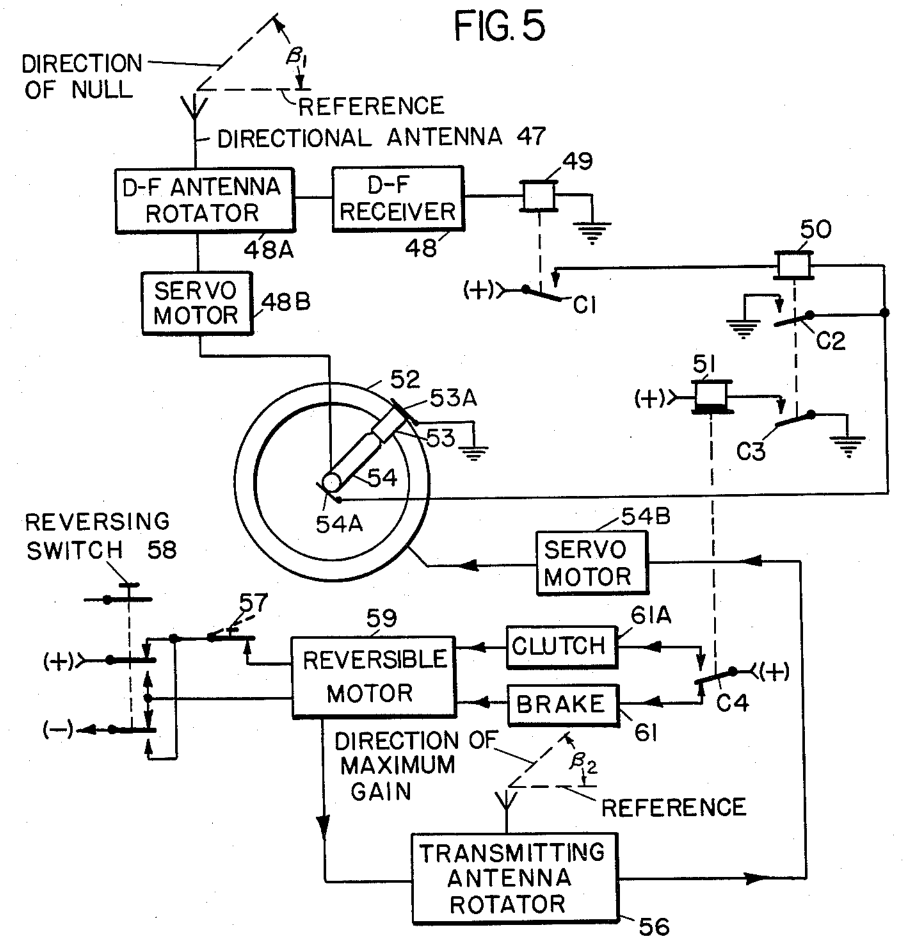
FIGURE 5 illustrates one form of directional finding equipment which may be employed in the systems of our invention.

Referring to FIGURE 5, the direction-finder consists of a rotating dipole array having a null direction, i.e., a direction for which a minimum or zero signal is received from the transmission to which the direction-finder is tuned. The output of the direction-finder is connected to a fast-acting sensitive relay 49. The receiver output is adjusted so that as antenna 47 rotates, the contact C1 of relay 49 remains closed except for the short time intervals during which the D.F. antenna is passing through its null position.

Now referring to the bottom of FIGURE 5, there is shown an annular ring 52 having a brush 53 which is connected by a slip ring contact 53A to ground. Inside this annular ring 52 is a conductive rotating element 54 which is connected through a slip ring contact 54A to the right-hand terminal of the winding of relay 50. Element 54 is aligned in the direction of the null of the directional antenna 47, i.e., it is rotatably aligned relative to some predetermined reference by the same angle that the null of antenna 47 makes relative to a given reference, angle $\beta_1$, and then locked in position. As antenna 47 is rotated by antenna rotator 48A, servomotor 48B correspondingly rotates element 54.

The annular ring 52 is driven by a servomechanism 54B coupled thereto and is rotated in synchronism with the transmitting antenna so that the azimuth direction of element 54 relative to the predetermined reference coincides with the azimuth direction of maximum gain of the transmitting antenna or relative to its predetermined reference. As antenna 47 rotates, relay 49 normally remains closed except for the short time intervals when antenna 47 is passing through its null position. Also, once each revolution of the D.F. antenna, element 54 will contact brush 53, thus bridging contact C2 of relay 50 and resulting in the energization of relay 50 provided that contact C1 of relay 49 is then in its normal, closed position. This bridging of contact C2 occurs irrespective of the current angular position of ring 52 which "follows" the transmitting antenna. When contact C2 is bridged in this manner, relay 50 is energized and is thereafter locked in closed position when its own front contact C2 closes. This action also closes front contact C3 of relay 50 which then energizes relay 51.

With start-stop switch 57 closed and reversing switch 58 set manually for the desired direction of track of the transmitting antenna mount, motor 59 will be energized, thereby rotating the antenna through rotator 56. Whereas, brake 61 is energized when relay 51 is dropped away and its back contact C4 is closed, clutch 61A is engaged when front contact C4 is closed. Thus, the transmitting antenna rotator 56 is actuated by motor 59, thereby slowly revolving the directional transmitting antenna.

Since relay 51 is a slow release relay, it will not drop out when contact C1 of relay 49 opens and de-energizes relay 50 even though relay 50 remains dropped away until the next succeeding contact between element 54 and brush 53. Therefore, since relay 51 remains picked up, the transmitting antenna, turns in the direction of the satellite's orbit as selected by reversing switch 58.

As the transmitting antenna slowly turns, the synchronized turning of annular ring 52 eventually causes it to reach a position where brush 53 is in such a position that, some time during the interval that relay 49 is dropped away as antenna 47 rotates into its null direction, brush 53 makes electrical contact with element 54. In other words, relay 49 opens and remains open during the entire time that brush 53 and element 54 are in contact. Under this condition, no circuit is completed to energize relay 50 for a time in excess of the time of one revolution of antenna 47 so that relay 51 becomes deenergized, and the clutch mechanism 61A declutches while brake 61 holds the transmitting antenna rotator 56 in the then-attained direction. As the position of the satellite moves into a different azimuth bearing, relay 50 resumes its operation in the manner previously described and the antenna rotator 56 is thus caused to track the satellite. Additional relays can obviously be used to control a receiving antenna in the vicinity of the direction-finder. Thus, it is possible to keep both the directional transmitting antenna and the directional receiving antenna at each of the stations pointed in the direction of the satellite or space station.

The one-way communications circuits 9 and 26 (FIGURE 1B) may be either radio or wire circuits when stations A and B are both on the earth's surface and may be any commercial circuit, provided only that they will transmit the modulations of the intelligence being transmitted by the system and that their time delay variations do not exceed one millisecond over a period of a few minutes. The actual time delays of transmission of the modulations between stations A and B must be compensated for in this system when the system is one wherein the difference in distances between the space station and the respective stations A and B is significant and when the type of signal used is such that a given amount of delay interferes with proper reception of the intelligence. More specifically, fairly substantial differences in delay times can be tolerated when voice communications are used; whereas, the same amount of difference might very well prove troublesome when a high-frequency pulse code is used. In providing such compensation, the following will occur:

All modulations reaching stations A, B, C, et cetera will be delayed the correct amount so that the modulated signals on frequencies $f_{ta}$, $f_{tb}$, $f_{tc}$, et cetera will reach the satellite or space station simultaneously. This delay may be measured in microseconds, milliseconds, seconds, or longer periods of time and depends solely on the relative position of the satellite and space station with reference to the earth and other stations A, B, C, et cetera.

Figure 7:
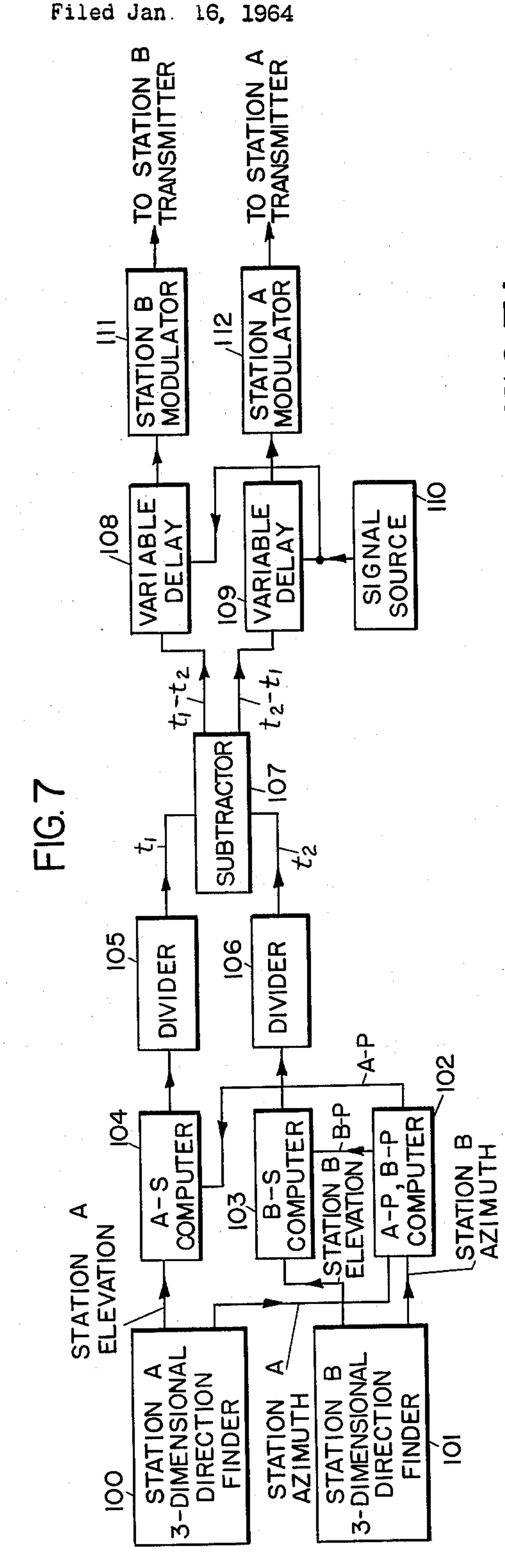
FIGURE 7 is a block diagram illustrating apparatus for automatically controlling the delay applied to signals to compensate for differences in transmission times over widely different signal paths.
Figures 6, 7A:
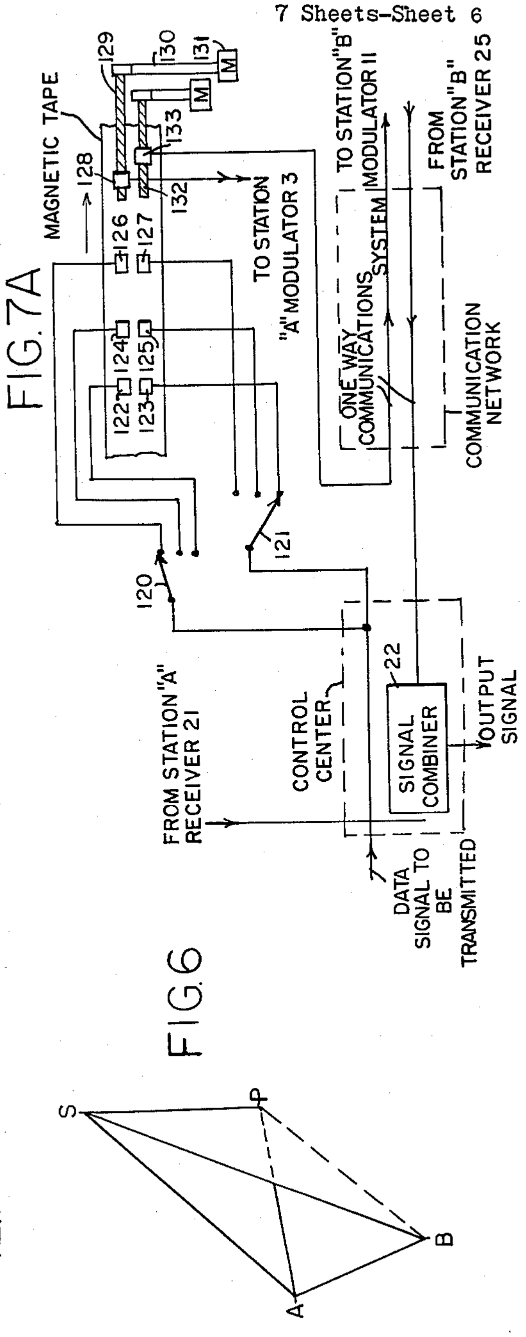
FIGURE 6 illustrates certain geometrical considerations involved in a determination of distances.
FIGURE 7A illustrates apparatus for controlling the relative delays of respective modulating signals to compensate for differences in transmission time over widely different signal paths, such apparatus not having the automaticity of the apparatus of FIGURE 7.

Apparatus which provides for the several modulating signals from widely spaced transmitting stations to reach a space station simultaneously is illustrated in FIGURE 7A. The apparatus of FIGURE 7A comprises a modification of that shown in FIGURE 1B.

More specifically, a variable time delay means is provided which is interposed in the system between the source of the data signal to be transmitted and the respective modulators of the several stations from which the modulation is to be transmitted. Thus, the data signal to be transmitted is shown in FIGURE 7A as being fed to the control center and from there via the respective selector switches 120 and 121 to a magnetic tape delay device. From there, the signal is applied to the station A modulator 3 (see FIGURE 1B) and also over the communications network to the Station B modulator 11.

Referring to the magnetic tape delay apparatus of FIGURE 7A, this comprises a magnetic tape which moves with a uniform velocity in the direction of the arrow. A plurality of recording heads 122–127 is provided, three of these, i. e., recording heads 122, 124, 126 being associated with one longitudinal recording track, while the others, i.e., 123, 125, 127 are associated with a different recording track. The signal which is to be variably delayed prior to being applied to the Station A modulator 3 is applied to a selected one of the recording heads 122, 124, 126 through the slectable switch contact 120. When the signal is recorded on the tape by one of the recording heads 122, 124, 126 in accordance with the then-selected position of switch 120, it is delayed by an amount corresponding to the travel time of the tape from the particular recording head then in use to the associated read head 128. The position of the read head 128 longitudinally along the tape is adjustable by means of rotation of threaded shaft 129 which is rotatable by means of a belt drive 130 from motor 131. To obtain maximum delay, switch 120 is operated to the position shown so as to provide maximum distance between the recording head 122 and read head 128. To obtain close adjustment of the amount of delay desired, read head 128 is adjusted in position to provide the desired distance between the selected recording heads and a read head 128. Where lesser amounts of delay are desired, switch 120 can be moved to either of the other two positions shown to provide thereby a shorter distance between the selected recording head and read head 128.

The delay which is provided with respect to the signal applied to the station beam modulator 11 is controlled in an entirely similar manner. Thus, the switch 121 is operated to one of the several positions shown in accordance with whether a large or a small amount of delay time is required. Finer adjustment is secured by properly positioning read head 133 by rotation of the corresponding threaded shaft 132.

The amount of delay that should be provided for the signal having the shortest propagation path to the satellite or space station relative to any other signal transmitted from a geographically widely spaced station to the same satellite or space station can readily be determined empirically. Thus, it is not essential that apparatus be provided to determine automatically the relative distances and thus the relative delay times. In practice, the desired relative delay of the several signals is quite readily determined by monitoring the signal received from the space station. If the received signal is garbled because of improper phase relationships between the several signals received at the space station, the relative relays are accordingly adjusted at the ground station until the garbled condition disappears.

Apparatus which will automatically provide the proper relative amounts of delay for the signals from stations A and B, for example, to cause such signals to arrive simultaneously at a space station is shown in FIGURES 6 and 7. The apparatus disclosed from the automatic computation of the difference in distance between two respective stations and the space station and the related apparatus for determining the relative delays to be applied to the respective signals transmitted from such stations to the space station constitutes subject matter which was not disclosed in the parent application Serial No. 29,111, filed May 13, 1960, and with respect to which the present application is a continuation-in-part. It is only by reason of the addition of the apparatus for providing this automatic control of the relative delays that the present application is termed to be a continuation-in-part.

Apparatus to automatically determine the proper relative amounts of delay must of necessity receive data as to the relative distances of the space station from each of the two stations A and B. FIGURE 6 illustrates some of the geometrical considerations involved in the determination of these distances.

In FIGURE 6, S represents the space station and P the suborbital point, i.e., the point on the earth's surface lying along the line connecting space station S with the earth's center. A and B represent, respectively, the locations of the earth's stations A and B, and it is desired to determine the distances A*s* and B*s*, from which there can be computed the transmission times of signals between the respective stations A and B and space station S, thereby permitting a computation of the difference in these times. Once this difference is known, the signal having the shorter transmission time may be suitably delayed so that it will arrive at its destination simultaneously with the signal from the more distant location.

By employing either a pair of direction finders at each of the stations A and B similar to that shown in FIGURE 5, there is made available at each of the stations both azimuth and elevation angles from that station to space station. In other words, referring to FIGURE 6, and angles PAB and PAS are known at station A, and similarly, the angles ABP and PBS are known at station B. Since the distance A*b* is also known, the triangle ABP is fully determined, and from this, there can be computed the length of AP and BP. With these known, and recognizing that angles SPA and SPB are both right angles, one can then see that triangles SPB and SPA are now fully determined so that the distances SA and SB are known. Dividing each of these distances by the speed of light, there is obtained the time required to transmit from each of stations A and B to station S, and a simple subtraction of these two times then determines the amount of delay that should be applied to the signal from the station which is then more remote from space station S to compensate for the longer transmission time from that station to the space station. In addition to this, variable delay circuit 109 in FIG. 7 may be provided with an appropriate delay, over and above that provided as just described, to compensate for the transmission delay incurred in transmitting the signal intelligence over the communication circuit extending from the control center (see FIGURE 1A) to station B.

FIGURE 7 shows in block diagram form one form of apparatus which may be used to carry out the aforementioned computations. Three dimensional direction finders 100 and 101 are shown, one for each of the stations A and B. Each direction finder produces two output signals, one representing the elevation angle from that station to the space station and the other representing the azimuth angle. The azimuth angles at stations A and B are both supplied to a computer 102 which then determines the length of AP and BP which is readily determined once these azimuth angles are provided to computer 102 since distance AB is fixed. One output of computer 102 which represents the length of BP is supplied to a similar computer 103 which also receives an input signal representing the elevation angle measured at space station B. With these two input parameters, computer 103 can readily compute the distance DS and supply this output signal to a divider 106. In a similar manner, computer 104 receives an input signal from computer 102 which represents the length of AP. Computer 104 also receives an output from direction finder 100 which represents the measured elevation at station A. Provided with this information, computer 104 can readily compute the distance AS and provide a corresponding output signal to divider 105.

Both dividers 105 and 106 divide their respective input distance signals by the constant factor representing the speed of light, thereby making available by each divider a time signal $t_1$ to $t_2$ which represents the time required for the transmission of the signal between the respective stations A and B and space station S. These two time signals $t_1$ and $t_2$ are applied to a subtractor 107 which subtracts these two time signals from each other and provides two separate outputs, one representing the difference $t_1$ minus $t_2$ and the other representing the difference $t_2$ minus $t_1$. If $t_1$ is greater than $t_2$, the difference $t_1$ minus $t_2$ is a positive quantity and subtractor 107 then provides an analog signal to variable delay 108 which is proportional to this difference. Under these circumstances, the output signal applied to variable delay 109 may be zero. On the other hand, if the interval $t_2$ exceeds interval $t_1$, then the difference $t_2$ minus $t_1$ is a positive quantity which is applied to variable delay 109, and delay circuit 108 then receives zero input signal.

Signal source 110 represents the source of data signals to be transmitted from stations A and B to space station S. The output of signal source 110 is applied to both the variable delays 108 and 109 where they are selectively delayed in accordance with the time signal input to each of these delay circuits before being applied as input to the associated modulator 111 or 112. Assuming again that $t_1$ exceeds $t_2$, this means that station A is more remote from station S than station B and this means that the transmissions from station B must be suitably delayed in accordance with the difference $t_1$ minus $t_2$. Accordingly, the different signal representing $t_1$ minus $t_2$ is applied to delay circuit 108 to selectively control the delay of the input signal to the modulator for station B. It will be obvious from the foreging description that the Station A signal will be delayed by variable delay 109 in a similar manner when station B is more remote from space station S than is station A.

There remains one final effect with regard to the system shown in FIGURE 1A. This is the fact that the frequency of the received signals received at the space station or earth satellite will depend upon the Doppler-shift as well as the radiated frequency. With the system shown in FIGURE 1A, where a plurality of stations are so disposed that their radio waves intersect at a substantial angle upon reaching the earth satellite or space station, it is clear that the Doppler shift will be different for each station. Therefore, if each station transmits on the identical radio frequency, the received signals will vary as the Doppler shift from each station. Conversely, in order that each of the received signals will have the same frequency at the earth satellite or space station, it is necessary to transmit different frequencies from stations A, B, C, et cetera. With frequencies of the order of 100 mc./s., the expected Doppler shifts are not great for earth satellites, and the above is only of academic interest. However, when frequencies of several thousand megacycles/sec. or even 850 mc./s. are used, the Doppler shifts observable on earth satellites increase by a factor of about 10 times the shifts at 100 mc./s. Furthermore, in the case of space probes, very much larger frequency shifts may occur. In the case of earth satellites and with stations A, B, . . . on the earth's surface, it is quite possible for the satellite to be rapidly approaching one station and receding from the other, which will cause the Doppler shifts to be in opposite directions.

Now referring to FIGURE 8, it is seen that for radiation of the transmitters at stations A and B on the identical carrier frequency, namely $f_{ta}$ and $f_{tb}$, there will be two different frequencies received at the space station. Each will vary from the radiated frequency by the Doppler shift between *that* station and the satellite. As the frequency of transmissions to satellites increases and as the speeds of satellites increases, then the Doppler shifts $\Delta f_a$ and $\Delta f_b$ increase. Furthermore, with increasing speeds and frequencies, the difference between the two signals received at the space station will increase—up to the point at which either one or both of the frequencies transmitted are outside of the pass band of the receiver.

Now referring to FIGURE 9, it is seen that by transmitting the signals from stations A and B on different frequencies, which in this particular illustration are shown as higher than the nominal received frequency, it is possible to cause the two frequencies received at the space station to approach each other and to approach the frequency nominally assigned so that they will enter the pass band of the space station receiver. Obviously, it is possible to operate this system in such a manner that the difference between the two frequencies, as shown in FIGURE 8, may approach any desired value. We do this as follows: The space station transmits on a single frequency which for the rays $f_{ra}$ and $f_{rb}$ in FIGURE 1B is identical. Now because of the Doppler shift, the frequency received at each of the stations A and B is different. Knowing the assigned frequency of the space station and measuring the received frequency independently at both stations A and B, we determine the Doppler shift at each station. By adjusting the transmitters at each station to that frequency indicated in FIGURE 8 for each station, it is thus possible to place the signals received at the space station within the pass band of the space station receiver at the assigned frequency.

Now referring to FIGURE 9, it is a part of our invention to provide in addition to the manual methods of shifting the earth-controlled transmitter frequencies, an automatic method for accomplishing the same shifts. In connection with the communications with earth satellites, which pass over the observing stations at relatively low altitudes compared to the altitude or distance to space stations, the Doppler shift causes the frequency received from ground or earth stations to change rapidly. In FIGURE 9, a signal voltage having a frequency shift $f_1$–$f_2$ is applied to the circuit shown. Isolating resistor 87 causes an essentially constant current to flow through inductor 94. In a similar manner a signal voltage of frequency $f_3$–$f_4$ is applied through isolating resistor 90 and causes an essentially constant current to flow through inductor 95. Th signal voltage of frequencies $f_1$–$f_2$ is obtained by beating in heterodyne circuit 115 the signal received by receiver 113 from the space station, i.e., $f_1$, with a precision oscillator 114 adjusted to the frequency $f_2$ of the transmitter in the space station. The beat frequency obtained is the Doppler shift resulting from relative motion between the earth and space stations, which after suitable amplication is applied to the circuit shown. Similarly, the signal of frequency $f_3$–$f_4$ is obtained by beating in heterodyne circuit 119 the frequency of the transmitter 116 at this same station with a precision frequency standard provided by oscillator 117 which is adjusted to the nominal frequency within the pass band of the satellite receiver.

The voltages generated across inductors 94 and 95 are rectified by diodes 92 and 93 and then compared on the balancing network of resistors 88, 89 and 91. Since the D.C. current resulting from the signal $f_1$–$f_2$ travels through resistor 91 in an opposite direction to the D.C. current resulting from the signal $f_3$–$f_4$, when the network is balanced, the junction of resistors 88, 89, and 91 is at zero potential. The D.C. recording potentiometer 96 detects any unbalance and actuates the variable master oscillator 118 in such a direction as to cause the transmitter frequency to vary from the nominal space receiver pass band frequency by an amount equal to the Doppler shift. This discussion of the method of operation assumes that the satellite and ground stations are both operating on the same frequency and that the value of resistors 88 and 89 is adjusted to maintain this balance. Now it is a feature of our system and this circuit that by adjusting resistors 88 and 89, it is possible with the apparatus of FIGURE 9 to use the signal $f_1$–$f_2$ obtained from one carrier frequency at the space station (for example 400 mc./s.) to generate correction of the transmitter frequency on a carrier frequency other than that, $f_1$, received from the space station (for example 420 mc./s.) so that the frequency received by the satellite receiver will have been compensated for the Doppler shift in transmission at such other frequency and will fall within the pass band of the space station receiver.

Another feature of our invention is the radiation from the space station transmitter of a plurality of frequencies say $f_{10}$, $f_{11}$, $f_{12}$, . . . et cetera so related that when transmitting to a plurality of ground stations, these ground stations may maintain receivers tuned to a specific assigned frequency and, as a result of the Doppler frequency shift, at least one of the plurality of frequencies $f_{10}$, $f_{11}$, $f_{12}$ . . . , all of which are modulated with the same signal or intelligence, will fall within the pass band of the specific radio frequency to which these receivers are tuned. Obviously, the Doppler frequency shift will vary independently at the plurality of stations receiving these space station signals, that frequency of the plurality of frequencies radiated by the space station, which falls within the receiver pass band at station A, may be different from that at stations B, C, et cetera. On the other hand, there may be times for which the same frequency of the plurality $f_{10}$, $f_{11}$, $f_{12}$ . . . will provide satisfactory communications with more than one of the earth-controlled receiving stations.

Having thus disclosed our invention, what we claim as new and desire to secure by Letters Patent of the United States follows:

1. The method of communicating intelligence by radio waves between at least two bodies in space in motion with respect to each other where a first of said bodies includes an antenna having at least one null orientation with respect to radio waves received from a predetermined direction, said method comprising the steps of:
   (a) transmitting the intelligence simultaneously via at least two separate radio waves from at least two geographically widely separated transmitting stations on said second body respectively and with said stations having sufficient separation that the two lines of sight from the location of said antenna on said first body to each of said separated transmitting stations on said second body form a finite angle therebetween which exceeds the angular cross section of the antenna null;
   (b) and responding at said first body in space only to strongest of the several signals received from said transmitting stations on said second body;

whereby said antenna on said first body can have at any time a null orientation with respect to, at most, one of said radio waves and said first body thereby continually receives said intelligence from said second body.

2. The method of claim 1 in which the intelligence transmitted from one of said transmitting stations is delayed by an amount causing it to be in time and phase coincidence at said first body with the intelligence received on said second body from the other of said stations.

3. The method of claim 1 wherein said two separate radio waves transmitted to said first body are on respectively different nominal carrier frequencies.

4. The method of claim 1 in which the frequency of said radio waves transmitted from the respective transmitting stations on said second body is adjusted by an amount substantially equal and opposite to the amount of Doppler frequency shift produced in said wave as received on said first body.

5. The method of claim 1 in which the same intelligence is transmitted from each of said transmitting stations on each of a plurality of respectively different carrier frequencies all of which are radiated in substantially the same direction toward said first body but which travel over different propagation paths because of the different refractions experienced by the respectively different frequencies, whereby at least one of said carrier frequencies from each said transmitting station is likely to impinge upon said first body.

6. The method of claim 5 in which said first body radiates at least one radio wave which is received by both said stations on said second body, and said plurality of frequencies is radiated from each said station on said second body in the direction of reception of said one wave from said first body even though the line-of-sight direction between said two bodies is constantly changing.

7. The method of communicating signal intelligence to a body in space where said body includes a directional antenna having at least one null orientation with respect to radio signals received from any predetermined direction, the method comprising the steps of:
   (a) transmitting said intelligence simultaneously in the form of modulated carrier radio waves from at least two geographically widely spaced stations whose spacing is sufficient in relation to the distance of said body that said antenna can have a null orientation with respect to at most one of said radio waves;
   (b) and responding at said body in space to only the stronger of the waves received from said two transmitting stations.

8. The method of claim 7 including the further steps for transmitting intelligence from said body in space to said transmitting stations which comprises:
   (a) energizing said antenna with a radio carrier wave modulated according to the intelligence to be transmitted from said body;
   (b) responding at each said station to the signal transmitted from said body;
   (c) and connecting an output circuit which is common to both said stations to the signal being received at each said station from said body;

whereby said output circuit is substantially continuously energized in response to a signal representing the intelligence transmitted from said body in space.

9. The method of claim 7 including the further steps of continuously orienting a transmitting antenna at each said station to maximize the amplitude of the signal transmitted toward said body.

10. The method of communicating intelligence to a space station having an antenna which is at times disposed in a null orientation with respect to a radio wave received from any predetermined direction and comprising the steps of:
   (a) transmitting simultaneously at least two carrier radio waves each modulated according to the intelligence to be communicated to said space station and with said waves emanating from stations sufficiently widely spaced that said antenna can have a null orientation with respect to at most one of said radio waves;
   (b) delaying the modulation on at least one of said carrier waves in accordance with the difference in the respective propagation times of the modulations from their common source to said space station to thereby cause the respective modulations on said waves to be substantially in time coincidence when received at said space station;
   (c) and responding at said space station to the stronger of the two carrier waves.

11. In a system for communicating intelligence via radio with a body in space having a directional antenna that may at times be null oriented with respect to a radio beam coming from any particular direction, the combination comprising: first and second transmitting means at geographically widely spaced locations for transmitting carrier waves simultaneously to said body in space with both said waves being modulated substantially simultaneously according to the intelligence to be transmitted to said body, said locations being so far separated that said directional antenna can at any instant have a null orientation with respect to at most one of the radio waves transmitted from said respective first and second transmitting means, receiving means on said body electrically coupled to said directional antenna and producing an output signal only in response to the received carrier wave which produces the greatest amplitude of signal in said directional antenna, and output means connected to said receiving means and being responsive to the demodulated output of said signal produced by said receiving means.

12. The system of claim 11 in which means is coupled to each said transmitting means to vary its frequency in response to the continuously measured component of velocity of said body relative to said transmitting location, whereby the carrier frequency received at said body from any transmitting station is substantially unvarying despite Doppler frequency shifts resulting from the relative velocity between said body and the location of said transmitting station.

13. The combination of claim 11 in which each said station includes at least one antenna for radiating electromagnetic energy to said body in space, and means is coupled to each said radiating antenna to continuously orient said antenna with respect to said body, whereby the maximum amplitude of radio wave is continually received by said antenna on said body from each said station.

14. A system for communicating intelligence between the earth and a space station having an antenna which may at times have a null orientation with respect to radio waves received from any one station on earth, the combination comprising: at least two stations on earth each comprising transmitting and receiving means and being sufficiently widely spaced that said antenna can have at most a null orientation with respect to radio waves originating with one of said stations but still permitting line-of-sight communication between each said earth station and said space station, means at each earth station for modulating a carrier frequency wave transmitted from that station according to the intelligence to be transmitted to said space station, means at said space station including demodulator means responsive only to the strongest of the carrier waves energizing said antenna, modulator means at said space station for modulating a carrier wave according to the intelligence to be transmitted to earth and energizing said antenna with the resulting modulating carrier wave to radiate said wave toward said earth stations, said receiving means including a receiving antenna at each earth station, and means connected electrically to each said receiving means at the respective stations and being responsive to the intelligence transmitted by said space station and being received by the associated receiving means.

15. The system of claim 14 wherein both said transmitting and receiving antennas at each earth station have directional sensitivity, and each said station includes antenna control means for orienting both receiving and transmitting antennas to have their maximum sensitivity generally in the line-of-sight direction with respect to said space station.

16. The combination of claim 15 wherein said antenna control means for each said station includes means responsive to said receiving means for orienting said receiving and transmitting antennas at the respective station toward the direction from which the receiving antenna receives the maximum energization from the signal transmitted from said space station.

17. The method of communicating signal intelligence between two widely spaced stations on earth via a body in space, comprising the steps of transmitting from one of said stations simultaneously different carrier frequency waves each modulated according to the intelligence to be transmitted, receiving at said body in space the several carrier waves impinging thereon, demodulating at said body in space the strongest of the several received carrier waves to thereby obtain a signal containing said intelligence, transmitting from said body in space another carrier frequency wave modulated according to said intelligence signal received from the strongest carrier, and receiving and demodulating at the other of said stations the modulated signal received from said body in space.

18. The method of claim 17 in which the signal from said body in space may be transmitted on any one of a plurality of different frequencies and the particular frequency selected at any instant is the one which is closest to that on which said body is then receiving the strongest signal from said one station.

19. The method of claim 18 in which an antenna at said other station is directed to have its maximum sensitivity along the direction from which said radio wave from said body in space is received.

20. Means for communicating between two bodies in space having a substantial radial velocity component therebetween resulting in a substantial frequency shift in a received radio wave as compared to the frequency of the transmitted wave and comprising, receiving and transmitting means at both said bodies with both transmitting means transmitting normally on respectively different nominal frequencies, first means at one of said bodies producing a first signal having a value representative of the frequency transmitted from the other of said bodies, means at said one body coupled to said receiving means responsive to said first signal for producing an output having at least one characteristic thereof which is proportional to the Doppler difference in frequency between the signal received at said one body from the other said body and the signal transmitted from said other body, second means at said one body producing a second signal having a value representative of the pass-band of frequencies of the receiving means for the other of said bodies, frequency-control means at said one body responsive to said output and to said second signal for controlling the frequency of the signal transmitted by said transmitting means from said one body to differ from its said nominal frequency by an amount substantially proportional to the amount of said Doppler frequency difference, said frequency control means shifting the frequency transmitted from said one body in a direction opposite to the direction of the frequency shift in the signal received from the other body, said receiving means on said other body being responsive only within a pass-band that encompasses said nominal frequency of said transmitting means at said one body.

21. Means for communicating between two stations in space having a substantial radial velocity component therebetween such that a radio wave transmitted from one station is received with a substantial Doppler frequency shift at the other of said stations, the combination comprising: first transmitting means at one of said stations for transmitting a carrier wave on a fixed predetermined frequency, first receiving means at said one station for receiving carrier waves occurring within a predetermined pass-band, second receiving means at the other of said stations receiving the carrier frequency wave transmitted from said one station, first means at said other station generating a signal representative of said fixed predetermined frequency, control means coupled to said second receiving means and responsive to said signal and being distinctively controlled according to the frequency difference between the carrier wave received from said one station and the predetermined frequency transmitted from said one station, variable frequency transmitting means at said other station operating at a frequency range other than said fixed predetermined frequency, said control means and said second means jointly varying the frequency of the carrier wave transmitted by said variable frequency transmitting means by an amount proportional to the frequency shift of the carrier wave received from said one station to thereby cause said carrier wave transmitted by said variable frequency transmitting means to be received by said first receiving means within said pass-band.

22. The method of communicating the same signal intelligence from each of at least two transmitting stations on one body in space to a receiving station on a second body in space comprising the steps of:

transmitting carrier waves from both of said two stations to said second body in space;

modulating each of said carrier waves with the signal intelligence to be transmitted to said receiving station on said second body in space;

measuring the difference in distance between each respective one of said transmitting stations on said first body in space to said receiving station on said second body in space;

and delaying the modulating signal intelligence to that transmitting station which is nearer said body in space relative to the same modulating signal intelligence for the other of said transmitting stations and by an amount substantially equal to the transmission time of said carrier wave in space over the distance measured in the immediately preceding step;

whereby said signal intelligence is received at said receiving station in substantial phase coincidence from both of said transmitting stations.

23. A system for communicting electromagnetic intelligence signals between bodies in space, said signals while being radiated between said bodies being subject to space propagation phenomena including spin fading, amplitude scintillation, frequency scintillation, polarization fading, signal reflection, signal ducting, and signal black-out, said system comprising, means on said one body including a first directive antenna means transmitting a first signal in a highly directive beam toward the other said body in space, and signal direction finding means on said one body responsive to a signal transmitted from said other body which is subject to said space propagation phenomena substationally the same as said first signal for continuously controlling the direction of transmission of said directive antenna means in both azimuth and elevation to maximize the intensity of signal reception at said other body, said direction finding means including at least one antenna means having a single axis of directivity and means responsive to coincidence of said axis with the direction of signal reception from said other body for controlling said directivity of transmission.

24. The system of claim 23 in which said other body in space is a satellite repeatedly orbiting about the earth's center.

25. The system of claim 23 in which said signal transmitted from said other body is an intelligence signal.

26. The system of claim 23 in which said direction finding means includes means for repeatedly moving said direction finding means to bring its single axis of directivity into momentary coincidence with said direction of energy reception from said other body in space.

27. A system for receiving an electromagnetic intelligence signal from a body in space, said received intelligence signal being subject to space propagation phenomena including spin fading, amplitude scintillation, frequency scintillation, polarization fading, signal reflection, signal ducting, and signal black-out, said system comprising means including a first directive antenna means for directionally receiving said signal from said body in space, and satellite signal direction finding means responsive to a signal from said body in space which is subject to said propagation substantially the same as said received signal for continually controlling the direction of reception of said first directive antenna means in both azimuth and elevation to maximize the intelligence signal received from said body in space, said direction finding means including at least one antenna means having a single axis of directivity and means responsive to coincidence of said axis with the direction of signal reception from said body in space for controlling said directivity of reception.

28. The system of claim 27 in which said body in space is a satellite repeatedly orbiting about the earth's center.

29. The system of claim 27 in which the signal to which said direction finding means responds is the same as said intelligence signal received by said first directive antenna means.

30. The system of claim 27 in which said direction finding means includes means for repeatedly moving said direction finding means to bring its single axis of directivity into momentary coincidence with said direction of energy reception from said other body in space.

References Cited by the Examiner

UNITED STATES PATENTS

| | | | |
|---|---|---|---|
| 2,140,130 | 12/1938 | Earp | 343—100 |
| 2,627,021 | 1/1953 | Hansell et al. | 343—101 X |
| 2,929,056 | 3/1960 | Page | 343—117 X |
| 2,966,583 | 12/1960 | Ross | 343—100 |
| 2,974,222 | 3/1961 | Lawson | 325—17 |
| 3,035,169 | 5/1962 | Griffith | 325—304 X |
| 3,036,210 | 5/1962 | Lehan et al. | |

OTHER REFERENCES

Bailey, "The Loctracs Air Traffic Surveillance Systems," Navigation, vol. 6, No. 8, Winter 1959–1960, pp. 497–506.

Baker, I.R.E., National Convention Record, vol. 7, part 5, pp. 143–151. Convention held March 23–26, 1959.

Bartow et al., "Design Considerations For Space Communications," IRE Transactions on Communication Systems, vol. CS–7, No. 4, December 1959, pp. 232–240.

Haviland, Astronautica Acta, vol. 4, No. 1, 1958, pp. 74, 5 relied on (complete article, pp. 70–89).

NASA Memo 5–25–59W, vol. 1, June 1959, 84 pp. Pages 1, 2, 64 and 65 relied on.

Oltman et al., I.R.E. National Convention Record, vol. 4, Part 1, July 1956, pp. 83–86.

CHESTER L. JUSTUS, *Primary Examiner.*

KATHLEEN H. CLAFFY, *Examiner.*

R. E. BERGER, *Assistant Examiner.*